Jan. 26, 1971   V. E. HAMILTON ET AL   3,558,408
PLASTIC LAMINATE AND BONDING MATERIAL THEREFOR
Filed March 31, 1965

VERN E. HAMILTON
LUTHER M. ROSELAND
INVENTORS

BY  Max Gulden

ATTORNEY

United States Patent Office 3,558,408
Patented Jan. 26, 1971

3,558,408
PLASTIC LAMINATE AND BONDING MATERIAL THEREFOR
Vern E. Hamilton, Palos Verdes Estates, and Luther M. Roseland, Santa Ana, Calif., assignors, by mesne assignments to McDonnell Douglas Corporation, Santa Monica, Calif., a corporation of Maryland
Filed Mar. 31, 1965, Ser. No. 444,310
Int. Cl. B32b 27/08, 27/26; G02b 5/20
U.S. Cl. 161—3                    4 Claims

ABSTRACT OF THE DISCLOSURE

Laminate comprising a plurality of layers of transparent plastic film selected from the group consisting of polycarbonate and polystyrene, adhesively bonded together by a cured transparent urethane polymer containing uncured epoxy resin, and preferably also including a chlorinated biphenyl, particularly suited for production of a transparent light filter body, each of the layers of such light filter body having a grid pattern thereon and forming a multiplicity of viewing cells, said light filter body being adapted to fit over a cathode ray tube; and an adhesive formulation employed for bonding such laminate at room temperature, containing urethane polymer, epoxy resin, a polyamine or polyol curing agent, and preferably also including a chlorinated byphenyl, the amount of curing agent employed being sufficient to react only with the isocyanate groups in the urethane polymer at room temperature, the epoxy resin functioning in the urethane polymer adhesive formulation as a plasticizer, the epoxy resin also improving the adhesion of the formulation to the plastic sheets, and increasing the index of refraction of the cement bond to more closely approach the index of refraction of the polystyrene and polycarbonate transparent films.

---

This invention relates to polycarbonate and polystyrene plastic laminates, and is particularly concerned with the fabrication of the transparent plastic laminates formed from a plurality of layers of polycarbonate or polystyrene thermoplastic films or sheets, bonded together by a cured urethane-epoxy resin. The invention also is concerned with an adhesive useful in bonding such plastic layers or sheets together to form such laminates, and to bonding or adhesive formulations containing urethane polymer together with other essential components.

Increasing interest in polycarbonate sheets and films has been developed recently due to the outstanding physical, thermal, and electrical properties of this material. Thus, polycarbonates are very tough over a broad temperature range and have high tensile strength and elongation, and show good retention of strength characteristics at increasing temperatures. Also, relatively wide usage has been made of polystyrene thermoplastic sheets and films because of the physical properties of this material, including its excellent dimensional stability and satisfactory strength, and its good thermal and electrical properties. Of particular importance, transparent polycarbonate and polystyrene sheets and films have good optical clarity and have outstanding light-transmission characteristics over the visible spectrum. Hence, polycarbonate and polystyrene films and sheets have become attractive for use in photography, as light lenses, and as light-transmission films when applied over cathode ray tubes.

Thus, for example, such polycarbonate and polystyrene thermoplastic films and sheets are especially suited for producing a space lattice-type filter body, useful for positioning over a cathode ray tube to intercept off-axis ambient light rays and improve the contrast of an image transmitted by said tube. The general construction and principles of operation of such filter are disclosed in the copending applications of Vern E. Hamilton, Ser. No. 230,644, filed Oct. 15, 1962, and of Vern E. Hamilton and Luther M. Roseland, Ser. No. 358,222, now Pat. No. 3,341,391 and of Luther M. Roseland, Ser. No. 358,241, the two latter applications filed Apr. 8, 1964. In making a filter of the type disclosed, a plurality of transparent polycarbonate or polystyrene films or layers are bonded together to form a laminate comprising the filter body. Each layer of plastic in such laminated filter body constitutes a separate filter body element on which is superimposed an image or geometric pattern, for example, by photography, printing, dye transfer, or by a diazo process. These respective layers or filter body elements in the form of polystyrene or polycarbonate film on which is superimposed a grid pattern, e.g., a printed ink grid pattern, must be superimposed on each other and bonded together with the patterns or images of the respective layers in accurate depthwise registry or alignment with each other to form a unitary light filter body.

In the above copending applications there is disclosed the fabrication of space lattice-type ambient light trapping filters from layers of plastic material having identical grid patterns printed thereon. The method comprises laying up a desired number of such layers with a suitable catalytic curing cement therebetween, aligning the layers with the grid patterns in depthwise registry, curing, then placing the assembly in a hoop type forming fixture, and blow forming the assembly to a spherical shape having the desired spherical radius. To accomplish the forming, the plastic laminate is quickly heated to a forming temperatlure, as by placing it in an oven or subjecting it to radiant heat for a few minutes, fluid pressure is applied to one side, and it is bulged to the desired spherical shape. It is then quickly cooled, preferably to room temperature, and each individual layer is now set and will resist changes in shape and dimension. All of the above operation takes place in only a few minutes, and the curing of the cement has progressed only moderately. While the cement holds the layers intimately together, it is still subject to creeping or "cold flow" in response to shear stresses.

When the part has been formed as described above, the viewing cells are divergent outwardly because the outer layers were stretched and the inner layers were compressed, considered in terms of their general plane. The next step is to cool the part, then to reverse its curvature or "snap it through" so that the convex outer layer becomes the concave inner layer and the concave inner layer becomes the convex outer layer. The layers are elastically strained to their new dimensions, and again the viewing cells diverge outwardly. Since each layer wants to retain its set dimension, or return to it, there is now a high tensile stress in the outer layer and a high compressive stress in the inner layer. Because the cement has been properly chosen for its adhesive qualities, strength, and curing rates, among other characteristics, it will now gradually creep or cold flow as the layers attempt to regain their set dimensions, and the viewing cells will gradually converge until they are collimated.

It will be seen that an adhesive or cement is required for the practice of the above process which will have adequate strength to hold the layers together, but which will have the creep characteristics to allow enough shearing to achieve collimation. The adhesive bond must have high clarity and light transmission value and must be compatible with the plastic materials chosen for the filter and the material used for producing the grid markings, that is, the adhesive should be inert with respect to the plastic layers and the ink forming the grid markings, and should wet the ink markings as well as the clean area between the markings to produce a strong, continuous optically clear bond between the layers of plastic. The plastic materials must be clear and highly transparent, strong and stable in the temperature ranges to which they will be subjected. Certain adhesive materials or compositions which possess the above noted bonding properties in the fabrication of the above laminates as described in the above copending applications, Ser. Nos. 358,222 and 358,241, include a liquid urethane polymer and a polypropylene glycol. Thus, although the incorporation of such polypropylene glycol in the adhesive formulation provided certain advantages including an increase in the adhesion between the adjacent plastic layers of the laminate, and functioning as an aid in adjusting the "creep" or cold flow characteristics of the adhesive, it has been found from experience that incorporation of the polypropylene glycol component has certain drawbacks, for example, under certain conditions such polypropylene glycol component caused crazing of the polystyrene plastic sheets.

It is accordingly an object of this invention to provide a transparent polycarbonate or polystyrene thermoplastic laminate bonded together by a strong, transparent adhesive.

Another object of the invention is the provision of a transparent laminate formed of a plurality of films or sheets of polystyrene or polycarbonate plastic, bonded together by an adhesive between each of the adjacent layers, which adhesive in the essentially cured stage has the ability to "creep" between the adjacent films of plastic when subjected to stress at elevated temperature, and to preserve itself in a thin, uniform layer substantially without rupture, when the laminate is subjected to these shear stresses at elevated temperature.

Another object is to provide a spherically shaped laminate composed of a plurality of plastic films or layers of transparent thermoplastic polycarbonate or polystyrene having a strong, thin, transparent special type bonding layer between adjacent films or layers of plastic, which does not cause crazing of such plastic sheets or have any other deleterious effect thereon.

Still another object is the provision of a spherically shaped transparent filter body composed of a spherically shaped laminate formed of a plurality of plastic films or layers of transparent thermoplastic polycarbonate or polystyrene having a strong, thin, transparent special type bonding layer between adjacent films or layers of plastic, the respective plastic layers having depthwise aligned grid patterns formed thereon.

A still further object is to form a transparent plastic laminate from a plurality of thermoplastic films of transparent polystyrene or polycarbonate, on which are superimposed a grid or cellular pattern, preferably by printing with a dye type ink, and employing an adhesive or bonding material between the respective layers, said adhesive having the property, when essentially cured, of "creeping" or deforming with time under a shear load at elevated temperature while maintaining the adjacent films in tight adhering engagement, and to form a thin, transparent, strong, flexible glue line between such layers upon curing of the laminate, said glue line having an index of refraction approximately equal to said plastic layers, said adhesive being inert with respect to the plastic substrate and the printed dye pattern.

Still another object of this invention is to provide a novel adhesive composition for bonding adjacent layers of transparent polycarbonate or polystyrene thermoplastic laminate, to form a strong, transparent bond between such layers.

A particular object is to provide an adhesive of low viscosity and good flowing characteristics which, when used as a bonding layer between adjacent films of transparent polystyrene or polycarbonate to form a laminate, does not cause crazing or have any other deleterious effect on such films, and has the ability to "lubricate" the adjacent films at relatively low temperatures such that the adjacent layers can move into alignment when placed under a stress load, while maintaining the adjacent films in tight adhering engagement, so as to form a thin, transparent, uniform, flexible glue line having the desired index of refraction between adjacent layers of such laminate and provide high adhesion between the layers when the adhesive or bonding material is fully cured.

Other objects and advantages of the invention will appear hereinafter.

It has now been found that polyurethane-epoxy mixtures, and preferably including a chlorinated biphenyl, provide a thin, strong, transparent bond between adjacent films of transparent thermoplastic polystyrene or polycarbonate, permitting formation of a strong transparent laminate composed of a plurality of such films by a bonding procedure carried out readily and avoiding distortion of the layers of the laminate. The urethane polymer-epoxy resin adhesive formulations of the invention employed as the bonding material between the adjacent films of polystyrene or polycarbonate have low viscosity, permitting easy application and uniform flow over the surface of the film, and substantially wetting the entire surface area to which it is applied and forming a void-free film. Such urethane polymer-epoxy resin adhesive formulations do not produce crazing of and do not adversely react with the polystyrene or polycarbonate substrate, or react with any dye type inks forming the above-mentioned printed grid patterns on the surface of the film, and have high adhesion to these substrates.

Where a dye-printed grid pattern is superimposed on the surface of the polystyrene or polycarbonate films, the urethane polymer-epoxy resin adhesive formulation wets and adheres to such printed surfaces, forming a continuous adhesive bond between the layers of polystyrene or of polycarbonate. For producing the space lattice-type light filter body, as described above, such urethane-epoxy resin adhesive, in the essentially cured stage and during the "forming" operation as described more fully below, holds the adjacent sheets or films of the laminate together, without delamination of the layers, and "creeps" at elevated temperature without rupture of the adhesive bond. This "creeping" characteristic of the urethane polymer-epoxy resin adhesive in essentially cured form permits slight displacement at elevated temperature of the respective layers of the laminate under shear stress where the respective layers carry patterns which require proper registration, as previously noted, and permits the desired registry or collimation of the grid patterns in the respective layers, e.g., so that the depthwise alignment of the grid cells is in a direction slightly convergent toward the viewer, as described in detail hereinafter. After forming of the laminate, and upon being returned to room temperature, the polyurethane-epoxy adhesive forms a tough but flexible thin bonding film.

The particular advantages of the employment of the novel adhesive formulation of the invention in producing laminates of the types noted above and particularly in producing an ambient light trap filter body, include better flow characteristics of the resin formulation, improved lubricating qualities in the uncured state of such adhesive formulation, a higher index of refraction of the adhesive bond which more closely approaches the desired value for matching with the index of refraction of the polystyrene or polycarbonate layers of the laminate, minimizes crazing, particularly of polystyrene films, permits registration of respective grid patterns in adjacent plastic layers, while the adhesive is still in the uncured state, and permits collimation at elevated temperature of such layers in essentially the cured state of such adhesive. The improved lubricity of the adhesive formulation noted above permits relatively low pressures to be used during lamination, e.g., on the order of 30 p.s.i. as compared to 125 p.s.i. ordinarily employed in the lamination process, and the polyurethane-epoxy resin formulation hereof is more resistant to thermal shock in the cured state.

A particular advantage of the employment of the novel adhesive formulation hereof in the fabrication of laminates which contain grid patterns in the adjacent layers and which require proper alignment or collimation as described above, is that following lamination of the respective layers and the above noted forming operation, such forming operation itself results in the desired alignment of the grid patterns or cells to a collimated or preferably slightly convergent alignment of the grid cells toward the viewer, and the subsequent "snapping" operation for turning the laminate inside out following the forming operation and which was required in the operations described in the above copending applications employing the adhesive formulation therein, is avoided according to the present invention. Thus, employing the adhesive formulation of the invention, such forming operation is performed at such a temperature as to provide a sufficient differential softening between the adhesive and the adjacent plastic films, so as to provide stresses in such films which will induce the plastic films to slide over each other due to the creeping characteristic of the adhesive formulation.

The thermoplastic polycarbonate or polystyrene films generally employed to form laminates, e.g., of the types noted above, are of a thickness of about 1 to about 10 mils. However, it will be understood that the invention is not to be taken as limited by any particular thickness of the polystyrene or polycarbonate substrate.

Various types of liquid urethane polymers or elastomers can be employed to produce the adhesive formulations employed as bonding material for the polystyrene or polycarbonate films according to the invention. These materials can be cured to a strong, flexible or rubbery solid material. Illustrative of the liquid urethane polymer base material of these adhesive formulations are the "Adiprene L" series of liquid urethane elastomers marketed by Du Pont. These materials are fully saturated polymers which contain, e.g., from about 4.0% to about 10% isocyanate groups by weight. Typical specific examples of such liquid urethane elastomers are the Adiprenes L-100, L-167, and L-315. The L-100 material contains about 4.0% to about 4.3% isocyanate groups by weight, the L-167 material about 6.1% to about 6.5% isocyanate groups, and the L-315 material about 9.2% to about 9.6% isocyanate groups. These polymers are cured by reaction of the isocyanate group with curing agents, e.g., polyamines or polyol compounds. These materials can also be cured by reaction with the moisture present in the air, but this is difficult to control consistently with varying relative humidity, and requires relatively prolonged curing time and is therefore not preferred. A preferred urethane elastomer for purposes of the invention is Adiprene L-100 because of its high flexibility.

The physical properties of Adiprene L-100 are set forth in the table below:

TABLE I

| | |
|---|---|
| Specific gravity | 1.06. |
| Viscosity at 86° F. | 14,000–19,000 cps. |
| Viscosity at 212° F. | 500–600 cps. |
| Appearance | A honey-colored liquid. |
| Odor | None. |
| Flash point | 480° F. |
| Solubility | Soluble in most common solvents; toluene, methyl ethyl ketone, ethyl acetate, $CCl_4$. |

Other examples of suitable urethane polymers which can be employed include the polyester based polyurethanes such as those marketed as the Vibrathanes by Naugatuck Chemical Company, and the polyether based polyurethanes such as the product marketed as Multrathane F-196 by Mobay Chemical Company.

Specific examples of polyamine and polyol curing agents which are preferably employed in the liquid urethane polymer adhesive formulations of the invention are 4,4'-methylene-bis-(2-chloroaniline), known as MOCA, triethanolamine, 1,4-butanediol, castor oil, diethylene triamine, di-amino diethylamine, and the like. MOCA has been found particularly suitable.

We have found, as a feature of the invention, that the addition of an epoxy resin, e.g., the reaction product of epichlorhydrin and bisphenol A, preferably in the form of a liquid, to the adhesive formulation of urethane polymer is particularly advantageous for laminating polystyrene and polycarbonate films. The epoxy resin functions in the urethane polymer adhesive formulation hereof, as a plasticizer or diluent, lengthens the work life or duration of the period of lubricity and flowability of the adhesive formulation and improves the creepability characteristics of the cement or adhesive bond at elevated temperatures after curing of the adhesive. Also, the epoxy resin has a high index of refraction, e.g., of the order of about 1.58, and thus contributes to increasing and improving the index of refraction of the cement bond to more closely approach and match the index of refraction of the adjacent polystyrene and polycarbonate transparent films. Further, the incorporation of the epoxy resin into the urethane polymer adhesive improves the adhesion of the formulation to polystyrene sheets as compared to a urethane polymer adhesive formulation in the absence of such epoxy resin.

In addition to the preferred epoxy resins produced by reaction of epichlorhydrin and bisphenol A (the diglycidyl ether of bisphenol A), other epoxy resins can be employed in the urethane polymer adhesive formulations hereof, including glycidyl ethers of glycerol, glycidyl ethers of bisphenol F, glycidyl ethers of tetrakis (hydroxyphenyl) ethane, and the like. Also, epoxy resins produced by reaction of epichlorhydrin, butadiene dioxide or diglycidyl ether, with mononuclear and polynuclear phenols such as resorcinol, hydroquinone, 4,4'-dihydroxy biphenyl and dihydroxy diphenyl sulfone may be employed.

Preferably, although not necessarily, both the urethane and epoxy resins are chosen with respect to molecular weight, so that they are in liquid form. However, for example, if desired, a solid epoxy resin can be employed, e.g., by diluting same with a suitable diluent such as the chlorinated biphenyl component of the adhesive formulation.

The proportions of epoxy resin to urethane polymer in the adhesive formulation of the invention can range by weight from about 10 parts of epoxy resin and 90 parts of urethane polymer, to about 40 parts of epoxy resin and about 60 parts of urethane polymer, and preferably from about 20 parts of epoxy resin and 80 parts of urethane polymer, to about 30 parts of epoxy resin and about 70 parts of urethane polymer. When less than 10 parts of epoxy resin to 90 parts of urethane polymer is employed, the index of refraction of the resulting cement bond between the plastic layers of the laminate is seriously reduced and there is a loss of creepability so that collimation of the viewing cells of the grid patterns on adjacent plastic layers of the laminate becomes more difficult in production of an ambient light filter trap body of the type noted above. When more than about 40 parts of the epoxy resin is employed per 60 parts of the urethane polymer, excessive creepability results, and hence loss of collimation of the grid patterns of adjacent plaster layers of the laminate can occur after a period of time.

Of particular significance in the instant invention, an amount of polyamine or polyol curing agent is employed which is less than stoichiometric for the combination of both the polyurethane and the epoxy resins present in the adhesive formulation. That is, the amount of curing agent preferably employed is such that most or practically all of the curing agent present reacts with all of the isocyanate groups in the urethane prepolymer, at room temperature. Since the above noted curing agent employed for the urethane polymer reacts very slowly with epoxy resins at room temperature, there is essentially no need for the presence of excess curing agent over and above that amount which reacts stoichiometrically with the polyurethane. In other words, the curing agents employed in the resin formulation of the invention react substantially entirely with the urethane resin for curing same and there is substantially no reaction of such curing agent with the epoxy resin present in the adhesive. It is thus believed that the epoxy resin present remains in the adhesive formulation in its initial form and functions essentially as a plasticizer or diluent. However, the invention is not to be taken as limited by any theory as to the function of the epoxy resin in the adhesive formulation of the invention.

The amount of curing agent which can be employed in the resin formulation of the invention can vary between about 7 to about 20 parts by weight per 100 parts of the urethane polymer. It has been found preferable to employ about 13 parts by weight of the curing agent per 100 parts of the urethane polymer.

According to preferred practice and as an additional feature of the invention, there is incorporated into the urethane polymer formulation, in addition to the epoxy resin noted above, a chlorinated biphenyl. Suitable chlorinated biphenyl for purposes of the invention are available in the trade; for example, they are made and sold by the Monsanto Chemical Company under its trademark designation "Aroclor." In terms of the trademark designation of the Monsanto Chemical Company, Aroclor 1221, a preferred form of this material for purposes of the invention, contains 21% by weight of chlorine. Generally, it has been found that chlorinated biphenyls containing from about 15 to about 25% by weight of chlorine produce best results. Chlorinated biphenyls having a chlorine content outside the above noted range cause excessive crazing in the laminate, particularly those formed of polystyrene layers.

Incorporation of the chlorinated biphenyl component into the resin formulation of the invention aids in reducing the viscosity of the adhesive formulation, advantageously increases the index of refraction of the adhesive bond, aids to increase the work life or period of duration of lubricity of the resin formulation during working, contributes to creepability of the resin bond as indicated above and described more fully below, reduces the combustibility of the system and improves fungus resistance and adhesion of the resin formulation.

The amount of chlorinated biphneyl which can be incorporated into the adhesive formulation of the invention can range from about 20 to about 70 parts per 100 parts of both, that is the sum of, the urethane polymer and epoxy resin components, by weight. Preferably, between about 20 and about 40 parts of the chlorinated biphenyl is employed per 100 parts of the sum of the urethane and epoxy resin components. If too large an amount of the chlorinated biphenyl is employed, the adhesive formulation tends to craze the adjacent plastic layers of the laminate, particularly polystyrene layers.

It has been found that the presence of the chlorinated biphenyl in the adhesive formulation is particularly advantageous where thin sheets or films of polycarbonate or polystyrene are to be laminated, e.g., having a thickness of about 1 to about 4 mils. Although the chlorinated biphenyl is a preferred component in the adhesive formulation hereof, in some instances, as in the case where relatively thick sheets or films of polycarbonate or polystyrene plastic is employed in the laminate, e.g., having a thickness of about 5 to about 10 mils, such chlorinated biphenyl can be omitted.

As an optional component, ultra-violet light absorbers can be added to the adhesive formulation. Illustrative of such light absorbers are the compounds 2-(2'-hydroxy-5'-methyl phenyl) benzothiazole, marketed as Tinuvin P, and 2-hydroxy-4-methoxy benzophenone, marketed as Cyasorb UV–9. These ultra-violet light absorbers can be employed in amount ranging from, for example, about 0.5 to about 3% by weight of the adhesive formulation.

Also, there can be added optionally to the adhesive formulation a trace of a whitener, e.g., the whitener marketed as Perox blue, and understood to be an anthraquinone dye. The trace amount of whitener thus added to the formulation tends to mask off any yellow coloration which sometimes is imparted to the thin bonding or adhesive layer following curing.

The following are examples illustrating the novel adhesive formulation of the invention which can be employed in producing improved polystyrene or polycarbonate laminates, particularly for use as ambient light filter bodies, according to the invention.

TABLE II.—COMPOSITIONS

|  | Parts by weight | | | | | |
| --- | --- | --- | --- | --- | --- | --- |
|  | A | B | C | D | E | F |
| Components: | | | | | | |
| Adiprene L-100 | 75 | 60 | 90 | 75 | 75 | 75 |
| Epon 828 | 25 | 40 | 10 | 25 | 25 | 25 |
| Aroclor 1221 | 30 | 30 | 30 | 20 | 40 | |
| MOCA | 10 | 8 | 12 | 10 | 10 | 10 |

Adiprene L–100.—Liquid urethane elastomer, marketed by Du Pont.

Epon 828.—Liquid epoxy resin believed to be a reaction product of epichlorhydrin and bisphenol A, marketed by Shell Chemical Corporation.

Aroclor 1221.—A chlorinated biphenyl containing 21% combined chlorine by weight, marketed by Monsanto Chemical Co.

MOCA.—4,4'-methylene bis-(2-chloroaniline).

The following examples further illustrate the adhesive formulation of the invention incorporating ultra-violet light absorbers therein:

COMPOSITION G

| | Parts by wt. |
| --- | --- |
| Adiprene L–100 | 75 |
| Epon 828 | 25 |
| Aroclor 1221 | 30 |
| Tinuvin P | 2.8 |
| MOCA | 10 |

COMPOSITION H

| | Parts by wt. |
| --- | --- |
| Adiprene L–100 | 75 |
| Epon 828 | 25 |
| Aroclor 1221 | 30 |
| Tinuvin P | 1.4 |
| Cyasorb UV–9 | 1.4 |
| MOCA | 10 |

Tinuvin P is 2-(2'-hydroxy-5'-methyl phenyl) benzothiazole Cyasorb UV–9 is 2-hydroxy-4-methoxy benzophenone.

In the formulations A to H above, instead of Adiprene L–100, other urethane polymers can be employed such as Adiprene L–167 containing about 6.1% to about 6.5% isocyanate groups, and the like; in place of the Epon 828 epoxy resin of the above formulations other epoxy resins such as the glycidyl ether of glycerol or the glycidyl ether of bisphenol F can be employed; and in place of Aroclor 1221 in the above compositions, other chlorinated biphenyls can be employed such as a chlorinated biphenyl containing about 17% chlorine by weight. Also, instead of MOCA employed in the above compositions A to H, other curing agents such as triethanolamine or a combination of castor oil and 1,4-butane diol, can be employed.

The accompanying drawing illustrates production of a transparent laminate in the form of a lattice-type filter body, employing an adhesive as bonding material, according to the invention principles. In the drawing.

Figure 1:
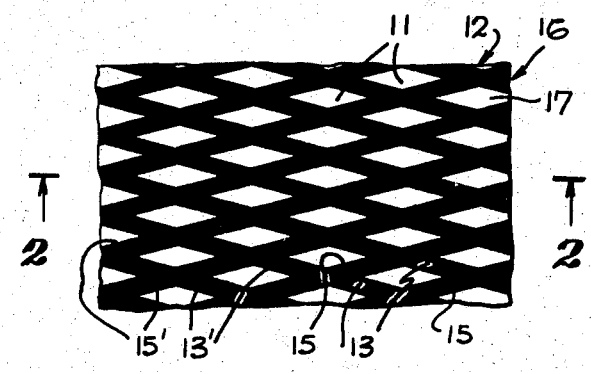
FIG. 1 is a plan view of one layer of film of a thermoplastic, e.g., polycarbonate or polystyrene, film having a printed geometric pattern in the form of grids or cells formed thereon.

The illustrations in the drawings are exaggerated for purposes of greater clarity.

Referring to FIG. 1 of the drawing, each of the films of transparent polystyrene or polycarbonate, represented by numeral 12, has a printed grid pattern 16 superimposed on one surface 17 thereof, as, for example, by printing, using a dye type of ink. As seen in FIG. 1, the grid pattern 16 on each film 12 is in the form of a plurality of like diamond-shaped cells or grids 11, arranged in horizontal and vertical rows, each cell having opposite parallel sides 13 and opposite parallel sides 15. Such grid pattern is formed by two sets of parallel lines 13' and 15' crossing each other at a suitable angle. The size of the grid pattern illustrated in FIG. 1 is exaggerated for the purpose of clarity. In one embodiment, the ratio of the width of the lines 13' and 15', forming the diamond grid pattern, to the spaces between the adjacent grid lines, is about 1 to 3. For example, the lines 13' and 15' can have a width about equal to the thickness of the polystyrene or polycarbonate films, e.g., about 2 mils thick. The layers must be secured together to form the laminate as described below, so that the grids of adjacent layers are in very accurate registry.

Figure 2:
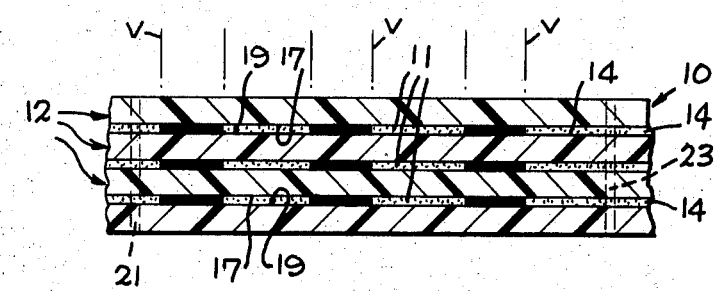
FIG. 2 is a section of a laminate formed by adhesively bonding together a plurality of the films shown in FIG. 1, and taken on line 2—2 of FIG. 1.

To provide such laminate, the respective layers or films of transparent polystyrene or polycarbonate are coated with a urethane polymer adhesive formulation containing epoxy resin and preferably also a chlorinated biphenyl, e.g., Composition A above, and the layers are placed one atop the other with the printed surface 17 of one layer adjacent an unprinted surface 19 of an adjacent layer, as seen in FIG. 2. The respective layers are aligned by means of alignment pins passed through aligned holes 21 and 23 at opposite ends of each of the films, as seen in FIG. 2, so that the grid patterns of adjacent layers are in accurate registry or alignment, and the viewing cells of adjacent layers are in parallel or collimated registry as indicated at V. The uncured adhesive permits relative movement or floating of the individual layers of the laminate to insure proper alignment or registration. The pins are connected to a means such as springs (not shown) to place an outward radial stress on the films.

The resulting unit or laminate 10 thus formed, composed of a plurality of layers of any desired number, e.g., 6 to 12 layers, of the above noted plastic film, with adjacent layers having an adhesive bonding film 14 of the urethane polymer-epoxy resin-containing adhesive, is placed in a press. The laminate is subjected to pressure of the order of 30 p.s.i. and is maintained either at ambient temperature or at elevated temperature up to about 175° F. During this curing period, the adhesive bond between the adjacent plastic layers 12 becomes essentially cured. Where this curing operation takes place at about room temperature, about 8 to 20 hours curing time is required. On the other hand, if the curing operation is carried out at elevated temperature of about 150° to about 175° F., the time period for the curing operation is reduced to about 3 to about 8 hours. However, it is preferred to carry out the curing operation at room temperature. The temperature at which the curing operation is made to take place also depends on the particular adhesive formulation employed. Pressure is required during this curing stage in order to obtain a thin glue line generally less than about 1 mil thick, preferably of the order of about 0.75 mil thick, between adjacent layers of polystyrene or polycarbonate film 12.

The resulting essentially cured laminate, as seen in FIG. 2, is a flat laminate, in which the depthwise aligned grid patterns of the respective plastic layers provide a multiplicity of closely spaced viewing cells 11. Such laminate is then removed from the press, the positioning or aligning pins are removed from holes 21 and 23, and the laminate is then subjected to a "forming" operation. In this operation the laminate is placed in a hoop-type retaining jig (not shown), the assembly rapidly heated to forming temperature, as by placing the assembly in a suitable oven (not shown), and the laminate blown to a spherical shape, as illustrated at 20 in FIG. 3, by fluid pressure applied against the concave inside surface of the laminate, indicated at 25. The laminate is heated to an elevated forming temperature for a short period sufficient to soften the laminate so as to permit forming or shaping the same at relatively low pressure. Thus, for this purpose, in the case of a polycarbonate laminate, temperature of the laminate preferably is raised to a temperature of from about 350° to about 400° F., and in the case of a polystyrene laminate, temperature preferably is raised to a temperature between about 190° and about 230° F.

The adhesive holds the layers intimately together during the forming operation, and the forming temperature applied in each instance is not so high as to cause an adverse effect on the adhesive bonding material, such as delamination of the plastic substrates or of the dye-printed pattern thereon. The laminate is then quickly cooled, preferably to room temperature, and at this stage the laminate is sufficiently rigid to resist changes in shape or dimensions. The time period of this forming operation from the commencement of heating to the cooling of the laminate ranges from about 2 to about 10 minutes, e.g., about 5 minutes. During the forming operation, the curing of the adhesive continues to a very small degree. The blowing pressure is then removed.

During the forming operation the cured polyurethane adhesive bond produced by the adhesive formulation of the invention has the important characteristic that it permits "creep" at elevated temperature under the shearing loads or stresses to which it is subjected during such forming, while holding the adjacent layers together without bond rupture, such that the layers 22, 24, 26 and 28 can be slightly displaced without delamination. During such creeping of the adhesive bond and gradual displacement of the layers, the viewing cells 11 of adjacent layers gradually converge. This creeping continues until the layers are displaced an amount such as to approach or to obtain substantial collimation or alignment of the viewing cells. However, slight convergence past parallel collimation of the viewing cells is often desired to compensate for the geometry of distorted cells on a spherical surface, as indicated at W in FIG. 3. The obtaining of such collimation of the viewing cells during the forming operation may require a period of the order of about 3 to 5 minutes. The flexibility, toughness and proper creep characteristics in the adhesive formulation of the invention permits such collimation during forming.

Figure 3:
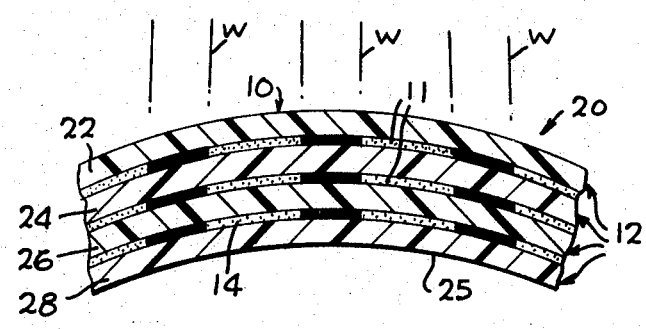
FIG. 3 illustrates the spherical shape of the laminate of FIG. 2, after the latter is subjected to the forming operation, showing the cells of the grid patterns substantially collimated but slightly convergent outwardly.

The characteristics of the urethane polymer adhesive can be controlled by varying the composition of the adhesive formulation, so that viewing cells 11 of the filter body shown in FIG. 3 following the forming operation are slightly convergent toward the viewer as previously noted. In the event that greater convergence of the viewing cells 11 toward the viewer is desired this is accomplished by grasping the laminate in a hoop of a special design (not shown).

The above series of operations provides a spherically shaped lattice-type light filter body, which is shaped to overlay a cathode ray tube, and which can be attached thereto, as by an adhesive, the laminate or filter body providing maximum contrast enhancement as result of the depthwise alignment or collimation of the filter cells 11 of the respective layers, in the manner noted above.

It is accordingly seen that the urethane polymer-epoxy resin adhesive of the invention is peculiarly and eminently adapted for the production of a transparent spherical light filter body of the type described above. Thus, the urethane polymer-epoxy resin-containing adhesive has the ability and strength to hold the layers of polystyrene or polycarbonate forming the filter body laminate together, but such adhesive at elevated temperature possesses "creep" characteristics to achieve the above noted collimation of the viewing cells, and the composition of the adhesive is sufficiently controllable to stop such displacement of the respective layers at a stage approaching or approximately at collimation, or in convergent alignment. The adhesive bond thus produced has high clarity and light-transmission value, is compatible with all of the elements of the laminate, including the plastic layers and the ink markings thereon, and does not cause crazing thereof.

The following are examples of practice of the invention for producing transparent plastic laminates or light filter bodies, utilizing the improved adhesive formulation of the invention.

EXAMPLE 1

Ten layers or films of transparent polycarbonate, each layer having a thickness of about 5 mils, and having a diamond grid dye-printed pattern on one surface thereof, e.g., as described above and shown at 16 in FIG. 1 of the drawing, are laid up in laminar form and registered, as described above and shown in FIG. 2, with the urethane polymer-epoxy resin adhesive formulation, Composition A above, being disposed between adjacent films or layers of the polycarbonate, forming nine glue lines.

The laminate unit is subjected to pressure and essentially cured at room temperature in about 8 to 20 hours. The laminate is then rapidly heated to a temperature of about 375° F., and subjected to the forming operation above described and illustrated in FIG. 3, to cause the laminate to assume a spehrical shape, and the laminate is then cooled. Such forming and cooling process takes place in a period of about 5 minutes. During the forming period the adhesive creeps without rupture of the adhesive bond, such adhesive bond having a thickness of about 0.75 mil between the respective layers. Such creep continues for a period of about 3 to 5 minutes to provide the spherically shaped light filter body illustrated in FIG. 3 and having the viewing cells 11 of the adjacent layers collimated in a slightly convergent direction outwardly as seen in FIG. 3.

The resulting laminate is a highly transparent light filter body which can be placed over a cathode ray tube and adhesively secured thereto, if desired, to permit substantially complete transmission of light through said tube while intercepting off-axis ambient light rays.

EXAMPLE 2

Six fiilms or layers of transparent polystyrene, each layer having a thickness of about 2 mils, are coated with the urethane polymer-epoxy adhesive formulation, Composition A above, and the layers superimposed over each other to form a laminate having five adhesive bonding or glue lines, according to the procedure of Example 1. Each of the polystyrene films has a printed grid pattern similar to that of FIG. 1, forming a plurality of cells 11, the grid patterns of the respectve layers being in registry as seen in FIG. 2. The multi-layer unit thus formed is placed in a press and essentially cured under pressure at room temperature for about 8 to 20 hours.

The laminate thus formed, having the essentially cured adhesive or bonding layers, is then rapidly heated to about 220° F. and subjected to a forming operation as described above and in Example 1, and then cooled quickly, the entire operation taking place in a period of about five minutes, to produce a laminate of spherical shape.

During the forming operation creeping of the adhesive as described above, occurs to form a completely transparent, spherically shaped strong light filter body in which the respective grid patterns of the adjacent layers are oriented with the viewing cells of adjacent layers in depthwise collimation, as shown in FIG. 3, and slightly convergent outwardly. The resulting filter body can be placed over a cathode ray tube, permitting high light transmission from an image transmitted by said tube, while filtering out ambient light rays and providing sharp image contrast. Over a period of time, no crazing of the polystyrene layers of the filter body laminate is observed.

EXAMPLE 3

A transparent plastic laminate formed of polystyrene films or layers each having a grid pattern of the type illustrated in FIG. 1 and described above, is produced substantially according to the procedure of Example 1, above, employing in place of adhesive Composition A, the urethane polymer-epoxy resin-containing adhesive formulation B.

The resulting laminate in the form of a high strength spherical light filter body is particularly adapted for use over a cathode ray tube and his light-transmission and ambient light ray filtering characteristics similar to the light filter produced in Examples 1 and 2. Also, over an extended period, no crazing of polystyrene layers of the filter is observable.

EXAMPLE 4

A polycarbonate filter body laminate is produced by procedure similar to that of Example 1 above, except that the adhesive employed is the urethane polymer-epoxy resin adhesive Composition D above.

A strong transparent spherical laminate is provided having light transmitting and ambient light filtering characteristics similar to the laminate of Example 1.

EXAMPLE 5

A polystyrene laminate formed of approximately 8 layers of polystyrene film each having a dye-printed grid pattern similar to that illustrated in FIG. 1, is produced by a process similar to that of Example 1 above, except that the adhesive employed is the urethane polymer-epoxy formulation, Composition C, E or F above. A transparent spherical light filter body laminate, the individual layers of which are highly adherent and free from crazing is produced, which can be secured by suitable means over a cathode ray tube, substantially improving the contrast of an image transmitted by said tube.

From the foregoing, it is seen that the novel adhesive formulation of the invention is particularly suited as a bonding material or adhesive for the production of a strong, highly transparent laminate or light filter body having high light transmission and formed from a plurality of films or layers of polystyrene or polycarbonate, such adhesive providing a strong thin layer of a urethane-epoxy resin having excellent strength and light-transmission characteristics. The urethane polymer adhesive formulations containing an epoxy resin, and preferably also including a chlorinated biphenyl, according to the invention, employed to produce laminates as described above possess a number of advantages, including low viscosity for proper flow over the entire surface between adjacent layers of the laminate, creepability during forming to permit desired realignment of viewing cells of a light filter laminate as described above, by reactive movement of the adhesive bond between laminate elements, high adhesion under severe environmental conditions, formation of a thin transparent glue line, good optical qualities of clarity and high index of refraction of the adhesive bond closely approaching that of the polycarbonate and polystyrene layers, freedom from adverse reaction of the adhesive with the substrate or with the ink of a printed grid pattern which may be superimposed thereon, freedom from crazing of such substrate, and excellent flexibility of the cured adhesive.

While we have described particular embodiments of our invention for the purpose of illustration, it should be understood that various modifications and adaptations thereof may be made within the spirit of the invention, and within the scope of the appended claims.

We claim:

1. In a transparent laminate comprising a plurality of layers of transparent plastic film selected from the group consisting of polycarbonate and polystyrene, adhesively bonded together by a cured transparent urethane polymer, the improvement comprising the inclusion of an epoxy resin which is an epichlorohydrin-bisphenol A condensation product, and wherein the curing agent for said urethane polymer is 4,4'-methylene-bis-(2-chloroaniline), the latter being employed only in an amount which reacts stoichiometrically with the urethane polymer.

2. The laminate according to claim 1 wherein a chlorinated biphenyl is included in the urethane polymer.

3. In a transparent light filter body comprising a plurality of layers of plastic film selected from the group consisting of polycarbonate and polystyrene, each of said layers having a grid pattern superimposed thereon and forming a multiplicity of viewing cells, said layers being adhesively bonded together by a cured transparent urethane polymer and forming a laminate, said laminate being spherically shaped and adapted to fit over and match the contour of a cathode-ray tube, the grid patterns of adjacent layers being in depth-wise alignment and said viewing cells being collimated, the improvement comprising the inclusion of an epoxy resin which is an epichlorohydrin-bisphenol A condensation product, said urethane polymer being cured by 4,4'-methylene-bis-(2-chloroaniline), the latter employed only in an amount which reacts stoichiometrically with the urethane polymer.

4. The light filter body of claim 3 wherein the urethane polymer includes a chlorinated biphenyl and the viewing cells are collimated in a slightly convergent direction outwardly.

References Cited

UNITED STATES PATENTS

| | | | |
|---|---|---|---|
| 2,906,717 | 9/1959 | Sekmakas et al. | 260—2.5 |
| 3,026,232 | 3/1962 | Finch | 156—212 |
| 3,117,046 | 1/1964 | Klockgether et al. | 156—304 |
| 3,194,885 | 7/1965 | Hamilton | 178—7.82 |
| 3,290,208 | 12/1966 | Lewis et al. | 161—190 |
| 3,341,391 | 9/1967 | Hamilton et al. | 161—3 |
| 2,847,395 | 8/1958 | Wear | 161—Epoxy Digest |
| 3,158,586 | 11/1964 | Krause | 260—830X |

OTHER REFERENCES

Bodnar, M. J. and Kelly, E. R., "Room Temperature Curing of Polyurethane Adhesives," Adhesives Age, vol. 2, April 1959, pp. 29–33.

Wood, R. N. Identification of the Urethane-Epoxy Reaction Product in SPE Transactions, vol. 2, No. 3, pp. 193–201, July 1962, TP1101S25. NOTE.—This journal is published by the Society of Plastics Engineers, who have changed the title of the journal to Polymer Engineering and Science after 1965.

"Epon Resins" Technical Disclosure Bulletin of Shell Chem. Co. Received in Scientific Library Oct. 18, 1957, p. 10.

Lee et al., Epoxy Resins, McGraw-Hill Book Company, Inc., New York, N.Y., 1957, pp. 20 and 33.

ROBERT F. BURNETT, Primary Examiner

R. L. MAY, Assistant Examiner

U.S. Cl. X.R.

156—330, 331; 161—183, 184, 190; 178—7.82, 7.86; 260—830